(12) United States Patent
Lou et al.

(10) Patent No.: US 10,452,422 B2
(45) Date of Patent: Oct. 22, 2019

(54) METHOD AND APPARATUS FOR DEPLOYING VIRTUAL MACHINE INSTANCE, AND DEVICE

(71) Applicant: Huawei Technologies Co., Ltd., Shenzhen (CN)

(72) Inventors: Yueyun Lou, Shenzhen (CN); Jidong Zhang, Shanghai (CN); Tao Qian, Shanghai (CN); Meisheng Liu, Shanghai (CN); Chuntao Wang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 222 days.

(21) Appl. No.: 15/637,812

(22) Filed: Jun. 29, 2017

(65) Prior Publication Data

US 2017/0300352 A1 Oct. 19, 2017

Related U.S. Application Data

(63) Continuation of application No. PCT/CN2015/084774, filed on Jul. 22, 2015.

(30) Foreign Application Priority Data

Dec. 29, 2014 (CN) .......................... 2014 1 0856837

(51) Int. Cl.
*G06F 9/455* (2018.01)
*H04L 29/08* (2006.01)
(Continued)

(52) U.S. Cl.
CPC .......... *G06F 9/45558* (2013.01); *H04L 29/08* (2013.01); *H04L 41/5054* (2013.01);
(Continued)

(58) Field of Classification Search
None
See application file for complete search history.

(56) References Cited

U.S. PATENT DOCUMENTS

| 8,392,575 B1 | 3/2013 | Marr |
| 2012/0284398 A1 | 11/2012 | Durham et al. |

(Continued)

FOREIGN PATENT DOCUMENTS

| CN | 102457517 A | 5/2012 |
| CN | 103023799 A | 4/2013 |

(Continued)

OTHER PUBLICATIONS

Machine Translation and Abstract of Chinese Publication No. CN103023799, dated Apr. 3, 2013, 9 pages.

(Continued)

*Primary Examiner* — Kenneth Tang
(74) *Attorney, Agent, or Firm* — Conley Rose, P.C.

(57) ABSTRACT

A method, a corresponding apparatus and device for deploying a virtual machine instance in order to lower requirements for a communication capability of a virtualized value-added server (VAS) and improve processing efficiency of a service chain, where the method includes obtaining communication relationships between a VAS instances and a service switch (SSW) instances from a service template, where the VAS instances and the SSW instances provide services in a service chain, and the service chain and the communication relationships between the VAS instances and the SSW instances are defined in the service template, and deploying, according to the communication relationships, an SSW instance and a VAS instance that need to communicate with each other in the SSW instances and the VAS instances on a same physical machine.

20 Claims, 9 Drawing Sheets

(51) Int. Cl.
*H04L 12/26* (2006.01)
*H04L 12/24* (2006.01)
*G06F 9/00* (2006.01)

(52) U.S. Cl.
CPC ............ *H04L 43/16* (2013.01); *H04L 67/101* (2013.01); *G06F 9/00* (2013.01); *G06F 2009/4557* (2013.01); *H04L 41/5045* (2013.01); *H04L 41/5048* (2013.01); *H04L 67/00* (2013.01)

(56) References Cited

U.S. PATENT DOCUMENTS

| | | | |
|---|---|---|---|
| 2014/0317261 A1 | 10/2014 | Shatzkamer et al. | |
| 2014/0334295 A1 | 11/2014 | Guichard et al. | |
| 2016/0044118 A1 | 2/2016 | Huang et al. | |
| 2016/0057234 A1* | 2/2016 | Parikh | H04L 67/16 709/226 |
| 2016/0188877 A1* | 6/2016 | Simha | G06F 21/552 726/22 |
| 2016/0330569 A1 | 11/2016 | Fu et al. | |
| 2017/0031623 A1* | 2/2017 | Gong | H04L 29/08 |
| 2017/0300352 A1* | 10/2017 | Lou | H04L 29/08 |

FOREIGN PATENT DOCUMENTS

| | | |
|---|---|---|
| CN | 103269280 A | 8/2013 |
| CN | 103812930 A | 5/2014 |
| CN | 103931162 A | 7/2014 |
| CN | 104009871 A | 8/2014 |
| CN | 104137482 A | 11/2014 |
| CN | 104636184 A | 5/2015 |

OTHER PUBLICATIONS

Machine Translation and Abstract of Chinese Publication No. CN103812930, dated May 21, 2014, 17 pages.
Machine Translation and Abstract of Chinese Publication No. CN104009871, dated Aug. 27, 2014, 11 pages.
Machine Translation and Abstract of Chinese Publication No. CN104636184, dated May 20, 2015, 16 pages.
Liang, J., et al., "Research on Deployment Strategy of Application System in Cloud Environment," Jisuanji Yu Xiandaihua, Aug. 2013, 7 pages.
English Translation of Liang, J., et al., "Research on Deployment Strategy of Application System in Cloud Environment" Jisuanji Yu Xiandaihua, Aug. 2013, 19 pages.
Foreign Communication From A Counterpart Application, Chinese Application No. 201410856837.6, Chinese Office Action dated May 17, 2017, 7 pages.
Foreign Communication From A Counterpart Application, PCT Application No. PCT/CN2015/084774, English Translation of International Search Report dated Oct. 21, 2015, 2 pages.
Foreign Communication From A Counterpart Application, PCT Application No. PCT/CN2015/084774, English Translation of Written Opinion dated Oct. 21, 2015, 6 pages.
Chen, J., et al.,"AAGA: Affinity-Aware Grouping for Allocation of Virtual Machines", XP032678407, IEEE 27th International Conference on Advanced Information Networking and Applications (AINA), Mar. 25, 2013, 8 pages.
Foreign Communication From A Counterpart Application, European Application No. 15874841.8, Extended European Search Report dated Jan. 23, 2018, 11 pages.

* cited by examiner

METHOD AND APPARATUS FOR DEPLOYING VIRTUAL MACHINE INSTANCE, AND DEVICE

CROSS-REFERENCE TO RELATED APPLICATIONS

This application is a continuation of International Patent Application No. PCT/CN2015/084774 filed on Jul. 22, 2015, which claims priority to Chinese Patent Application No. 201410856837.6 filed on Dec. 29, 2014. The disclosures of the aforementioned applications are hereby incorporated by reference in their entireties.

TECHNICAL FIELD

The present disclosure relates to the field of communications technologies, and in particular, to a method and an apparatus for deploying a virtual machine instance, and a device.

BACKGROUND

In fixed or mobile broadband access and data center applications, processing of multiple services based on layer 4 to layer 7 may exist. As shown in FIG. 1, in existing common networking, multiple service processing devices are usually connected in series after a fixed or mobile user access device. A service processing device may be a processing device used for anti-virus, a firewall, application caching and acceleration, web optimization, network address translation (NAT), home control, and the like. The user access device may be a mobile broadband gateway general packet radio service (GPRS) support node (GGSN) or packet data network gateway (P-GW), a fixed access broadband network gateway (BNG), the onion router (ToR) in a data center, or the like.

In an actual application, only a service flow of a user that has subscribed to anti-virus service may need to pass through an anti-virus service processing device, and only a video or web access service flow may need to pass through an application caching and acceleration service processing device. However, in the networking shown in FIG. 1, service flows of all users need to flow through all service processing devices that are connected in series regardless of whether corresponding service processing needs to be performed on these services flows. Consequently, a processing capacity demand of a service processing device increases, investment in unnecessary network devices increases, and fault points in the networking increase. Once a particular service processing device has a fault, interruption and a fault are caused to a whole service flow.

In order to resolve the foregoing problem brought by networking of multiple service processing devices connected in series, a concept of a service chain is proposed in the industry. A service chain is a sequence of services that a particular service flow needs to pass through. For example, a sequence, which is indicated by a service chain, of services that need to be passed through may be anti-virus service, a firewall service, and NAT service, and a sequence, which is indicated by another service chain, of services that need to be passed through may be application caching and acceleration, a firewall, and NAT. A service flow of a different service chain only needs to flow through a service processing device corresponding to a service indicated by the service chain.

As shown in FIG. 2, FIG. 2 is a network architecture diagram of a solution of a software defined network (SDN) GI, where GI is an interface between a GPRS and an external packet data network service chain in a network functions virtualization (NFV) architecture.

The SDN GI service chain in the NFV architecture includes the following logical function components. A traffic classifier (TC) configured to implement functions of service flow classification and identification and tagging (service chain ID), a value-added server (VAS) configured to provide a service in a service chain, such as web optimization, video optimization, and uniform resource locator (URL) filtering, a service switch (SSW) configured to provide a function of forwarding a service flow according to a flow table, and a basic layer 2 (L2) switching capability, and support network deployment across three layers by means of a channel such as a virtual extensible local area network (VxLAN), and a controller configured to provide maintenance and management of a service chain, collect a G-interface (Gi) local area network (LAN) network topology, and generate, according to the network topology and the service chain, a flow table (filter, action) used by the service chain and deliver the flow table to the SSW.

The foregoing TC, VAS, SSW, controller, and the like are all virtualized network function units (VNFs) or virtualized network sub-function units (sub-VNFs) in a virtual LAN, and may be virtual machines (VMs) instances and run on multiple physical machines in a distributed manner.

The SDN GI service chain in the NFV architecture may further include the following logical function component. A management and orchestration (MANO) node configured to deploy VNFs such as the foregoing TC, controller, SSW, and VAS on multiple physical machines or on a cloud according to definitions of a network service description (NSD) and a virtual network function description (VNFD).

In implementation of the SDN GI service chain in the NFV architecture, the TC first classifies a service flow and identifies a service chain label to which the service flow belongs. Then the SSW forwards, according to a sequence of services that is indicated in the service chain, a packet to a corresponding VAS for processing. After completing processing, the VAS returns the packet to the SSW. The SSW then sends the packet to a next VAS for processing until the packet is processed by all VASs.

It is found in practice that in implementation of the SDN GI service chain in the NFV architecture, multiple VASs and multiple SSWs are randomly distributed and run on multiple physical machines. The SSWs and the VASs may need perform communication across the physical machines or even communication across data centers, and pass through a very long forwarding path. As a result, requirements for a communication capability of a VAS are increased, and processing efficiency of a service chain is lowered.

SUMMARY

Embodiments of the present disclosure provide a method for deploying a virtual machine instance in order to lower requirements for a communication capability of a virtualized VAS and improve processing efficiency of a service chain. The embodiments of the present disclosure further provide a corresponding apparatus and device.

A first aspect of the present disclosure provides a method for deploying a virtual machine instance, including obtaining communication relationships between VAS instances and SSW instances from a service template, where the VAS instances and the SSW instances provide services in a service chain, and the service chain and the communication relationships between the VAS instances and the SSW instances are defined in the service template, and deploying, according to the communication relationships, an SSW instance and a VAS instance that need to communicate with each other in the SSW instances and the VAS instances on a same physical machine.

With reference to the first aspect, in a first possible implementation manner, that the communication relationships between the VAS instances and the SSW instances are defined in the service template includes at least one affinity group is predefined in the service template, each affinity group includes one SSW instance and one VAS instance that needs to communicate with the SSW instance, and communication relationships between the SSW instances and the VAS instances are determined by the at least one affinity group, and obtaining communication relationships between VAS instances and SSW instances from a service template includes obtaining the at least one affinity group from the service template.

With reference to the first possible implementation manner of the first aspect, in a second possible implementation manner, deploying an SSW instance and a VAS instance that need to communicate with each other in the SSW instance and the VAS instance on a same physical machine includes applying to an infrastructure layer for one affinity group resource pool for each affinity group of the at least one affinity group, where resources of the affinity group resource pools applied for the affinity groups belong to a same physical machine, determining an affinity group resource pool corresponding to an affinity group to which the SSW instance or the VAS instance belongs when the SSW instance or the VAS instance is deployed, and deploying the SSW instance or the VAS instance using a resource in the determined affinity group resource pool.

With reference to the first aspect or the first or second possible implementation manner of the first aspect, in a third possible implementation manner, the method further includes obtaining network topology information of the deployed SSW instance and the deployed VAS instance and releasing the network topology information on a controller.

With reference to the third possible implementation manner of the first aspect, in a fourth possible implementation manner, when the network topology information is changed, the changed network topology information is released on the controller.

A second aspect of the present disclosure provides an apparatus for deploying a virtual machine instance, including an obtaining module configured to obtain communication relationships between VAS instances and SSW instances from a service template, where the VAS instances and the SSW instances provide services in a service chain, and the service chain and the communication relationships between the VAS instances and the SSW instances are defined in the service template, and a deployment module configured to deploy, according to the communication relationships, an SSW instance and a VAS instance that need to communicate with each other in the SSW instances and the VAS instances on a same physical machine.

With reference to the first aspect, in a first possible implementation manner, at least one affinity group is predefined in the service template, each affinity group includes one SSW instance and one VAS instance that needs to communicate with the SSW instance, and communication relationships between the SSW instances and the VAS instances is determined by the at least one affinity group, and the obtaining module is further configured to obtain the at least one affinity group from the service template.

With reference to the first possible implementation manner of the first aspect, in a second possible implementation manner, the deployment module includes an applying unit configured to apply to an infrastructure layer for one affinity group resource pool for each affinity group of the at least one affinity group, where resources of the affinity group resource pools applied for the affinity groups belong to a same physical machine, a determining unit configured to determine to obtain an affinity group resource pool corresponding to an affinity group to which the SSW instance or the VAS instance belongs when the SSW instance or the VAS instance is deployed, and a deployment unit configured to deploy the SSW instance or the VAS instance using a resource in the determined affinity group resource pool.

With reference to the first aspect or the first or second possible implementation manner of the first aspect, in a third possible implementation manner, the apparatus further includes a releasing module configured to obtain network topology information of the deployed SSW instance and the deployed VAS instance and release the network topology information on a controller.

With reference to the third possible implementation manner of the first aspect, in a fourth possible implementation manner, the releasing module is further configured to release the changed network topology information on the controller when the network topology information is changed.

A third aspect of the present disclosure provides a computer device, where the computer device includes a processor, a memory, a communications interface, and a bus, where the memory is configured to store a computer execution instruction, the processor is connected to the memory using the bus, and when the computer device runs, the processor executes the computer execution instruction stored in the memory such that the computer device performs the method for deploying a virtual machine instance according to the first aspect of the present disclosure.

It can be learned from the above that in some feasible implementation manners of the present disclosure, using a technical solution of obtaining communication relationships between VAS instances and SSW instances and deploying an SSW instance and a VAS instance that need to communicate with each other on a same physical machine, the following technical effects are achieved.

Because the VAS instance and the corresponding SSW instance that need to communicate with each other are deployed on the same physical machine, the VAS instance and the SSW instance do not need to perform communication across physical machines, and the VAS instance only needs to have a simplest L2 communication capability. In this way, requirements for a communication capability of the VAS instance can be lowered, and processing efficiency of a service chain can be improved, thereby facilitating deployment of VAS instances of various types and implementing that deployment of the VAS instance in a network is not limited to the communication capability.

BRIEF DESCRIPTION OF DRAWINGS

In order to describe the technical solutions in the embodiments of the present disclosure more clearly, the following briefly describes the accompanying drawings required for describing the embodiments and the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

Embodiments of the present disclosure provide a method for deploying a virtual machine instance in order to lower requirements for a communication capability of a VAS and improve processing efficiency of a service chain. The embodiments of the present disclosure further provide a corresponding apparatus and device.

In order to make a person skilled in the art understand the solutions in the present disclosure better, the following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Detailed descriptions are separately provided below using specific embodiments.

Figure 3:
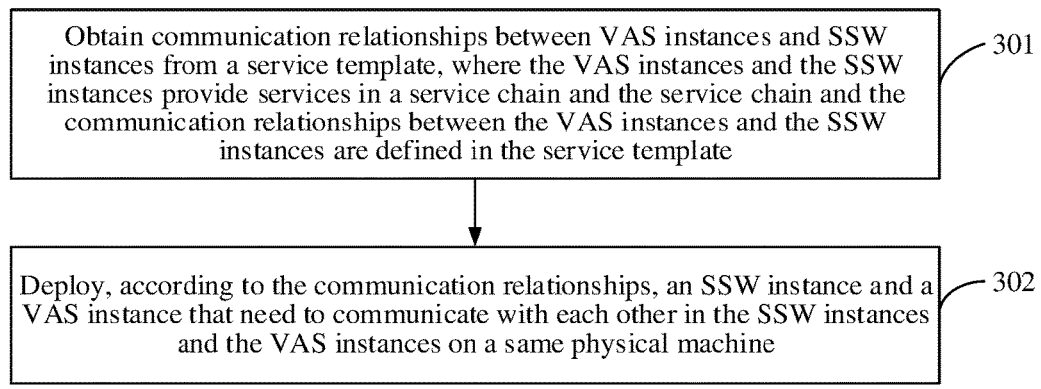
FIG. 3 is a flowchart of a method for deploying a virtual machine instance according to an embodiment of the present disclosure.

Referring to FIG. 3, an embodiment of the present disclosure provides a method for deploying a virtual machine instance, including the following steps.

Step 301: Obtain communication relationships between VAS instances and SSW instances from a service template, where the VAS instances and the SSW instances provide services in a service chain, and the service chain and the communication relationships between the VAS instances and the SSW instances are defined in the service template.

Figure 1:
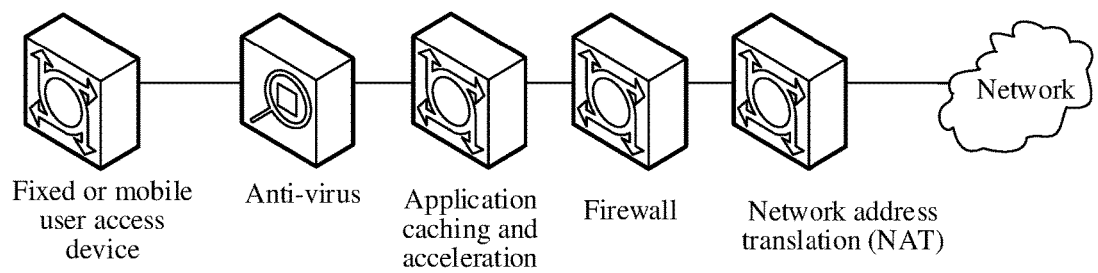
FIG. 1 is a schematic diagram showing that multiple service processing devices are connected in series.
Figure 2:
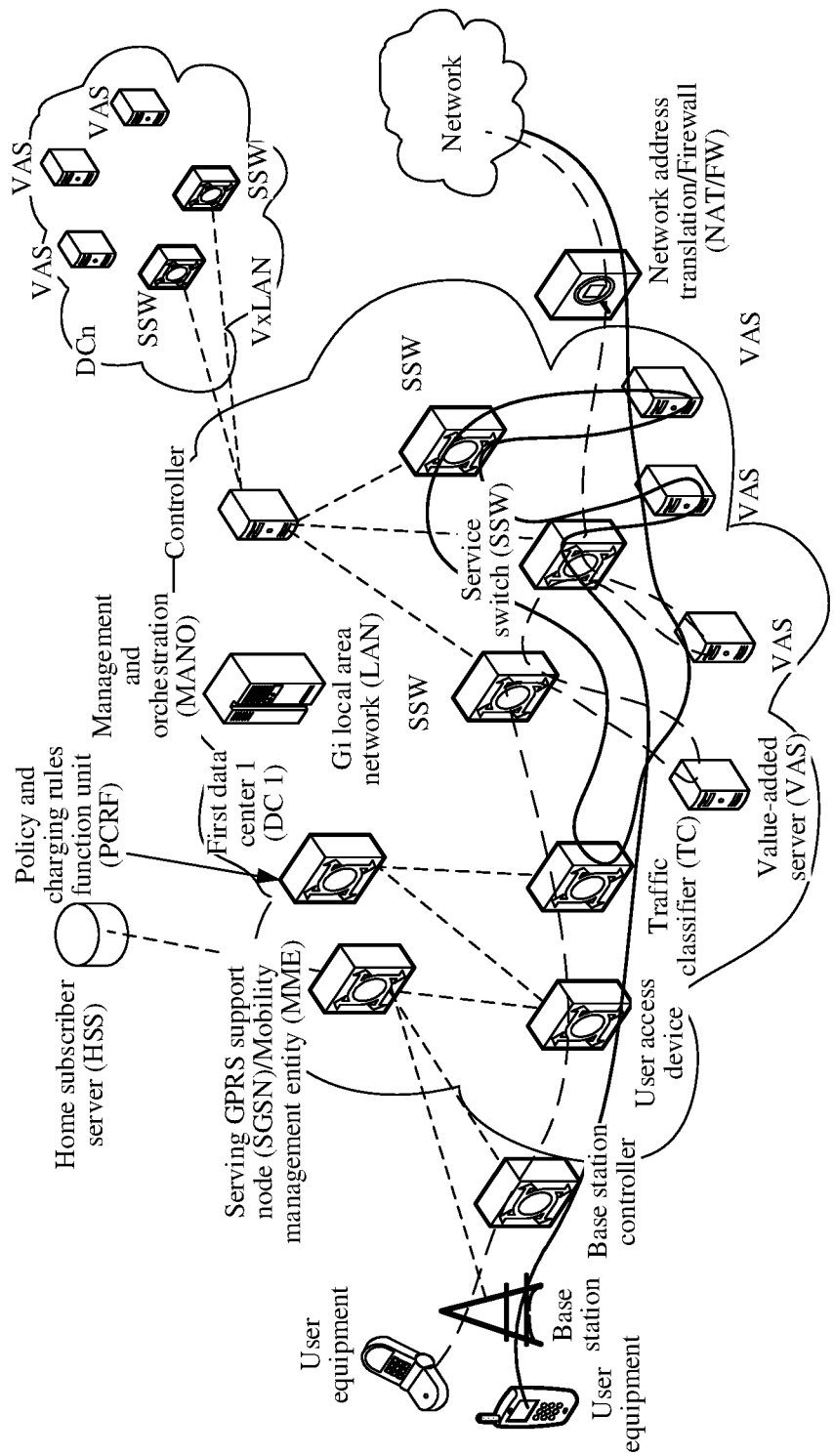
FIG. 2 is a network architecture diagram of an SDN GI service chain in an NFV architecture.

A network architecture shown in FIG. 2 is used as an example. In a network for providing a service chain service, instances such as a TC, a controller, an SSW, and a VAS run. The instances are carriers of network functions and may be objects created by categories. Further, the instances in this specification may be VMs. Virtual machine instances such as a TC, a controller, an SSW, and a VAS are usually deployed by a virtual machine instance MANO according to a predefined service template.

The service chain and multiple virtual machine instances, including the VAS instance, the SSW instance, and the like, for providing the services in the service chain are defined in the service template, and the communication relationships between the VAS instances and the SSW instances is also defined. The service chain is a sequence of services that is predefined according to actual user requirements. The service template may be further an NSD and/or a VNFD. The service template may be predefined manually and stored in the MANO. The definition may be understood as providing a set of parameters. For example, that the service chain is defined may be understood as providing parameters of the service chain, and that the multiple VMs are defined may be understood as providing parameters of the multiple VMs.

A packet that requires service processing always first arrives at the SSW instance, the SSW instance forwards the packet to a corresponding VAS instance for processing, and after completing processing, the VAS returns the packet back to the SSW instance. In this embodiment of the present disclosure, there are fixed communication relationships between the VAS instances and the SSW instances, and the VAS instance are always connected to and communicates with the fixed SSW instances. The communication relationships between the VAS instances and the SSW instances are predefined in the service template. The MANO may obtain the communication relationships between the VAS instances and the SSW instances by querying the service template. In the communication relationships, the SSW instances and the VAS instances are in a one-to-many relationship. One SSW instance may have fixed communication relationships with multiple VAS instances. However, one VAS instance can have a fixed correspondence with only one SSW instance.

Step 302: Deploy, according to the communication relationships, an SSW instance and a VAS instance that need to communicate with each other in the SSW instances and the VAS instances on a same physical machine.

In this embodiment of the present disclosure, when the MANO deploys virtual machine instances such as a TC, a controller, an SSW, and a VAS on multiple physical machines in the network or on a cloud according to the definition of the service template, the MANO deploys any SSW instance and one or more VAS instances that have communication relationships with the SSW instances on a same adjacent physical machine. In this way, a VAS instance only needs to be connected to and communicate with a corresponding SSW on a same physical machine and does not need to perform communication across physical machines. The SSW instance, as an ingress and egress for a service chain packet of the corresponding VAS instance, provides a powerful packet forwarding function and supports processing of communications interface protocols of various types. The VAS instance only needs to have a simplest L2 communication capability. The SSW instance and the corresponding VAS instance may perform packet switching using a virtual switch.

It can be learned from the above that in some feasible implementation manners of the present disclosure, using a technical solution of obtaining communication relationships between VAS instances and SSW instances and deploying an SSW instance and a VAS instance that need to communicate with each other on a same physical machine, the following technical effects are achieved. Because the VAS instance and the SSW instance that need to communicate with each other are deployed on the same physical machine, the VAS instance and the SSW instance do not need to perform communication across physical machines, and the VAS instance only needs to have a simplest L2 communication capability. In this way, requirements for a communication capability of the VAS instance can be lowered, and processing efficiency of a service chain can be improved, thereby facilitating deployment of VAS instances of various types and implementing that deployment of the VAS instance in a network is not limited to the communication capability.

Referring to FIG. 4 to FIG. 7, based on the method of the embodiment shown in FIG. 3, an embodiment of the present disclosure provides another method for deploying a virtual machine instance.

Figure 4:
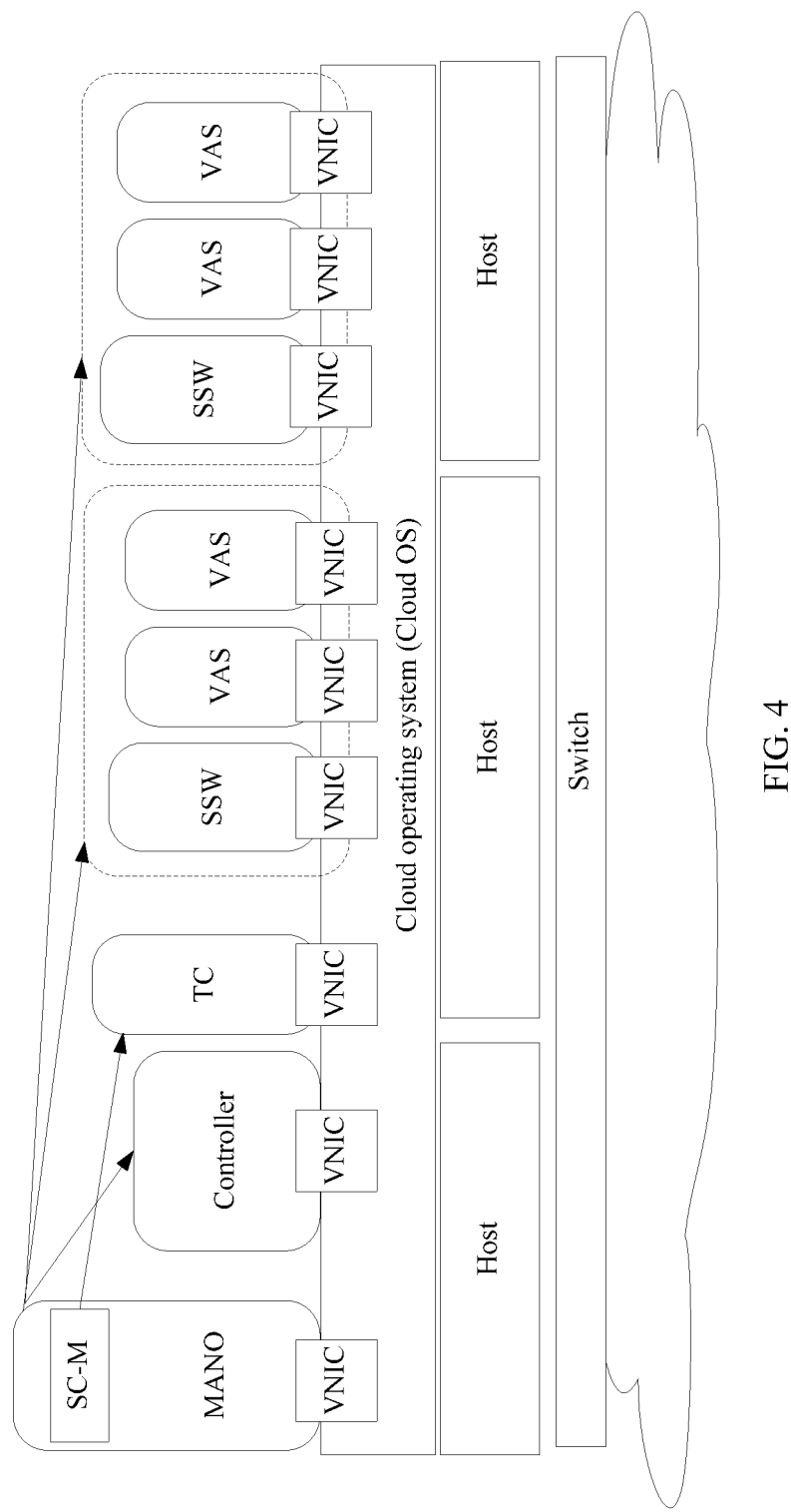
FIG. 4 is a schematic diagram of deployment of logical function components of a service chain.

As shown in FIG. 4, FIG. 4 is a schematic diagram of deployment of logical function components of a service chain in a solution of an SDN GI service chain in an NFV architecture in one embodiment of the present disclosure. As shown in FIG. 4, a system may include multiple physical machines, multiple VMs running on a host of each physical machine, and an infrastructure layer (layer I) resource.

The logical function components of the service chain are virtual machine instances running on the hosts. The logical function components include an MANO, and the MANO may be defined according to an NSD and/or a VNFD. Logical function components such as a TC, a controller, an SSW, and a VAS are deployed on multiple physical machines.

Figure 5:
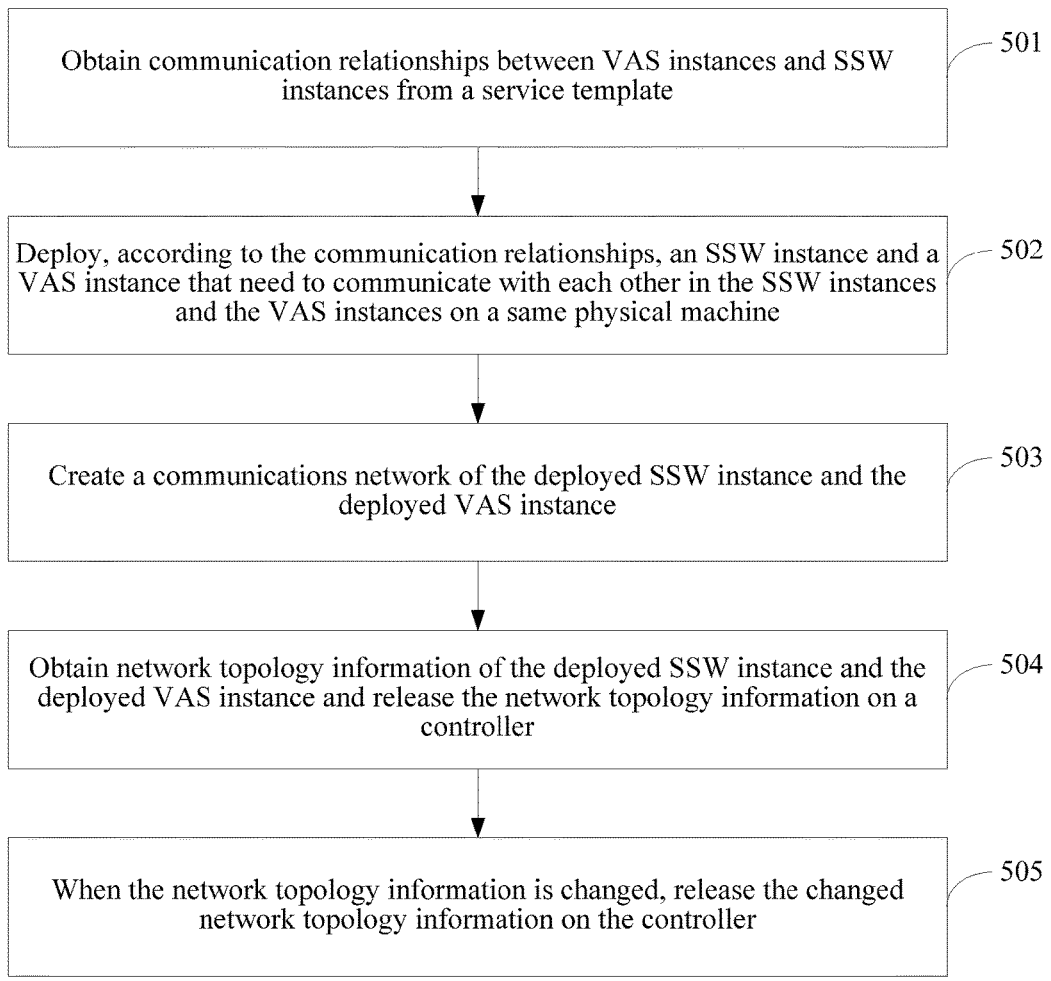
FIG. 5 is a flowchart of another method for deploying a virtual machine instance according to an embodiment of the present disclosure.

As shown in FIG. 5, the method for deploying a virtual machine instance in this embodiment of the present disclosure may include the following steps.

Step 501: Obtain communication relationships between VAS instances and SSW instances from a service template.

The MANO may obtain by querying the defined communication relationships between the SSW instances and the VAS instances from the service template such as an NSD and/or a VNFD.

Step 502: Deploy, according to the communication relationships, an SSW instance and a VAS instance that need to communicate with each other in the SSW instances and the VAS instances on a same physical machine.

When deploying SSW instances and VAS instances, the MANO performs adjacent deployment according to the communication relationships obtained by querying and deploys any SSW instance and a VAS instance that has a fixed communication relationship with the SSW instance on a same physical machine, or deploys a VAS instance and an SSW instance that need to communicate with each other on a same physical machine.

In some embodiments of the present disclosure, a VAS instance and an SSW instance that need to communicate with each other may be deployed on a same physical machine by means of an affinity group.

Optionally, step 501 may include the following steps.

Step 501a: An MANO obtains at least one predefined affinity group from the service template. At least one affinity group is predefined in the service template, each affinity group includes one SSW instance and one VAS instance that needs to communicate with the SSW instance, and the communication relationships between the SSW instances and the VAS instances is determined by the at least one affinity group.

In this embodiment of the present disclosure, an affinity group across VNFs in an network service (NS) may be predefined by the operation support system (OSS) in an NSD description and/or a VNFD description. An affinity group refers to a combination of an SSW instance and a VAS instance that need to communicate with each other. Each affinity group includes one SSW instance and at least one VAS instance that needs to communicate with the SSW instance (or at least one VAS instance that has a fixed communication relationship with the SSW instance). One VAS instance is always connected to and communicates with an SSW instance that has a fixed communication relationship with the VAS instance.

Before deploying the VAS instance and the SSW instance, the MANO may first obtain the predefined affinity group from the NSD description and/or the VNFD description that is set by the OSS such that when resource application and allocation are performed subsequently, resource application and allocation may be performed using affinity groups as a unit such that resources belonging to a same physical machine are allocated to the affinity groups.

Optionally, step 502 may include the following steps.

Step 502a: Apply to a layer I for one affinity group resource pool for each affinity group of the at least one affinity group, where resources of the affinity group resource pools applied for the affinity groups belong to a same physical machine.

In this embodiment of the present disclosure, resources of the affinity groups are managed using a resource reservation policy. The MANO may apply to the layer I for an affinity group resource pool in advance according to a setting of relationships between the affinity groups. The affinity group resource pool is used to deploy a VAS instance and an SSW instance in an affinity group. That is, when resources are allocated to the VAS instance or the SSW instance in the affinity group subsequently, the resources are allocated from the affinity group resource pool that is applied for in advance. Resources of the affinity group resource pools are all resources of a same physical machine.

Step 502b: Determine an affinity group resource pool corresponding to an affinity group to which the SSW instance or the VAS instance belongs when the SSW instance or the VAS instance is deployed.

An affinity group to which a to-be-deployed SSW instance or a to-be-deployed VAS instance belongs and a corresponding affinity group resource pool are first queried for when the SSW instance or the VAS instance is deployed. The to-be-deployed VAS instance may be a new VAS instance or may be a VAS instance generated by scaling out a deployed VAS instance. Scale out refers to an increase in a quantity of instances. That is, when a quantity of VAS instances processing a particular service is excessively small and cannot satisfy demands, one or more VAS instances that also process the service are added. The VAS instances generated by performing scale out refer to added VAS instances.

If the to-be-deployed SSW instance or the to-be-deployed VAS instance does not belong to any affinity group, the OSS may define, in the NSD description and/or the VNFD description, a new affinity group including the to-be-deployed SSW instance or the to-be-deployed VAS instance. Go back to step 502a to apply for an affinity group resource pool for the new affinity group.

Step 502c: Deploy the SSW instance or the VAS instance using a resource in the determined affinity group resource pool.

In this step, when a resource is allocated to a VAS instance or an SSW instance in an affinity group, the resource is allocated from an affinity group resource pool that is applied for in advance. Resources of the affinity group resource pools are all resources of a same physical machine. Therefore, any SSW instance and a VAS instance that has a fixed correspondence to the SSW instance can be deployed on a same physical machine. In addition, the manner of applying for an affinity group resource pool in advance can avoid resource fragmentation.

In some embodiments of the present disclosure, after the deployment step 502, the method may further include the following steps.

Step 503: Create a communications network of the deployed SSW instance and the deployed VAS instance.

Figure 7:
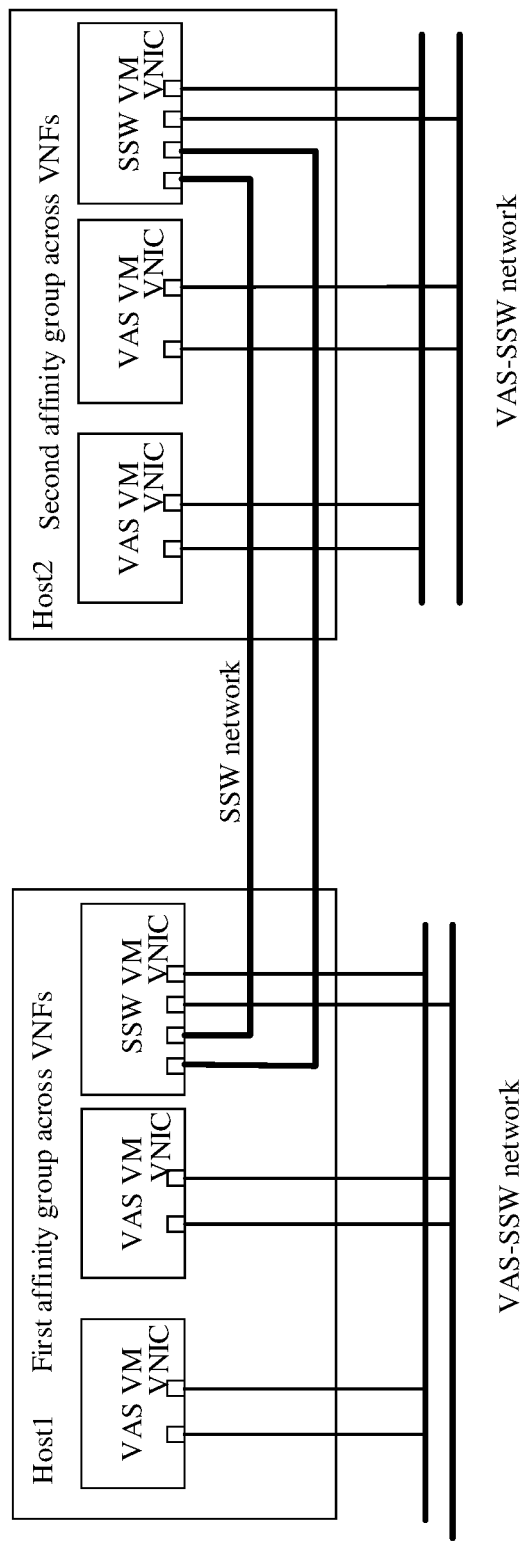
FIG. 7 is a schematic diagram of a communications network of an SSW instance and a VAS instance.

As shown in FIG. 7, FIG. 7 is a schematic diagram of a communication network of an SSW instance and a VAS instance in an implementation manner. FIG. 7 shows two Hosts. Two VAS virtual machine instances and one SSW virtual machine instance that belong to a first affinity group run on a first host (Host 1), and two VAS virtual machine instances and one SSW virtual machine instance that belong to a second affinity group run on a second host (Host 2). In a same affinity group, all VAS instances communicate with an SSW instance, and SSW instances in different affinity groups communicate with each other.

Step 504: Obtain network topology information of the deployed SSW instance and the deployed VAS instance and release the network topology information on a controller.

Step 505: When the network topology information is changed, release the changed network topology information on the controller.

Information releasing operations in step 504 and step 505 may be performed by a service chain manager (SC-M). In this embodiment, the SC-M is responsible for managing collection and releasing of the network topology information of the SSW instance and the VAS instance in the service chain. The SC-M may be deployed in the MANO or may be deployed outside the MANO, for example, in the OSS. Correspondingly, two optional implementation solutions exist.

In one implementation manner, as shown in FIG. 4, the SC-M is deployed in the MANO and is used as a functional module of the MANO.

The SC-M may obtain network topology information of all deployed SSW instances and VAS instances in real time using the MANO. The SC-M may release, in real time on the controller, the network topology information that is obtained in real time. Alternatively, the MANO may obtain network topology information of all deployed SSW instances and VAS instances in real time, and release the obtained network topology information in real time on the controller using the SC-M. The network topology information refers to description information of a network topology relationship.

The manner has high real-time performance, and can well support automatic scale out/scale in of the VAS instance, and real-time update of a network topology of the service chain.

Figure 6:
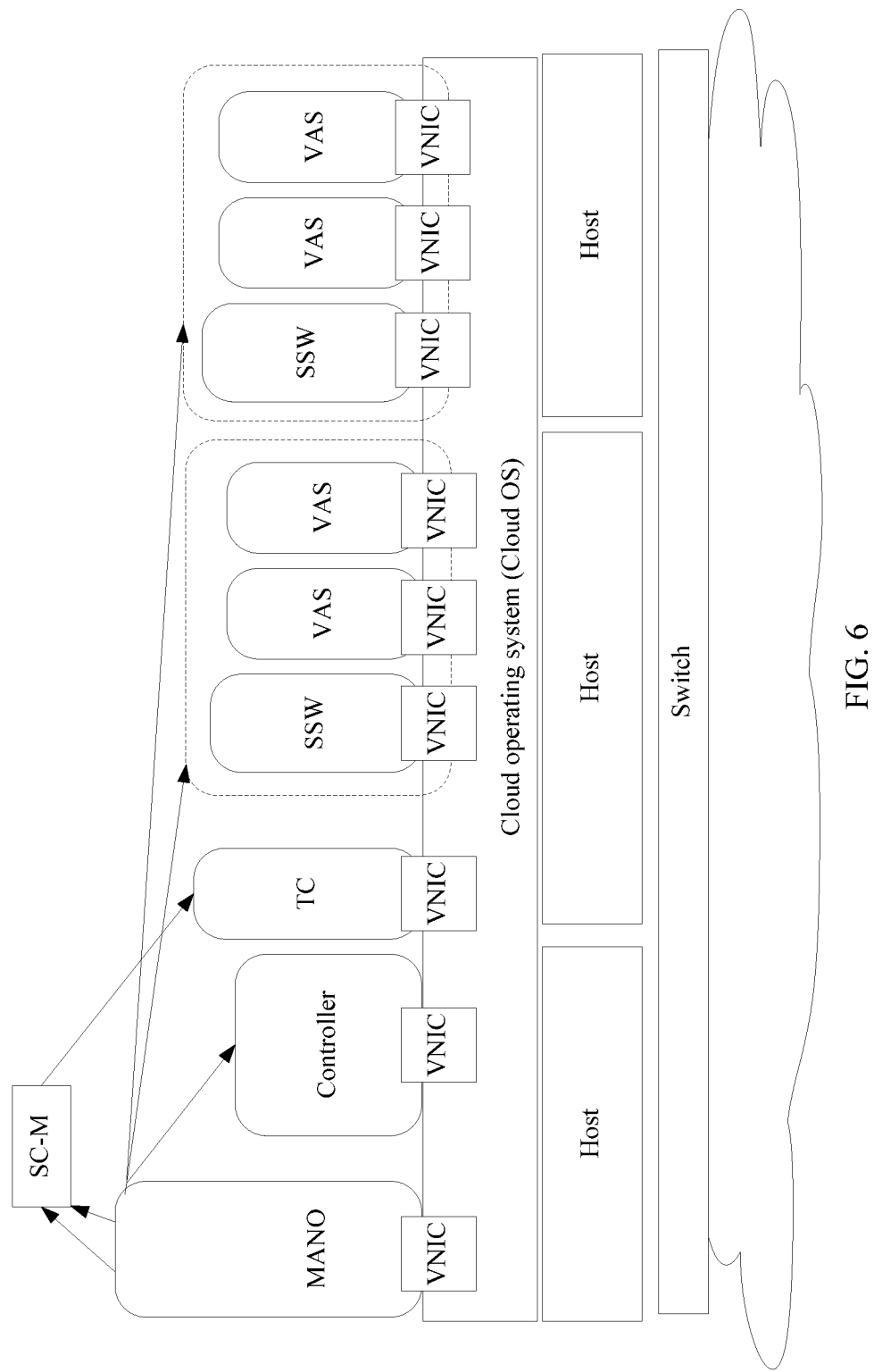
FIG. 6 is a schematic diagram of another deployment of logical function components of a service chain.

In the other implementation manner, as shown in FIG. 6, the SC-M is deployed outside the MANO, for example, in the OSS.

The SC-M needs to query the MANO to obtain network topology information of all deployed SSW instances and VAS instances, and release the obtained network topology information on the controller. Alternatively, the MANO may obtain network topology information of all deployed SSW instances and VAS instances in real time. In addition, after receiving a query request from the SC-M, the MANO sends the obtained network topology information to the SC-M and releases the network topology information on the controller using the SC-M.

In some embodiments of the present disclosure, the controller may perform forwarding relationship orchestration and management for the service chain according to the network topology information released by the SC-M, and generate a flow table and deliver the flow table to the SSW instance such that the SSW instance forwards, according to a flow table forwarding function, a packet to a corresponding VAS instance for processing.

In some embodiments of the present disclosure, using that the SC-M is deployed in the MANO and used as a module of the MANO as an example, step 504 of releasing the network topology information on a controller may include, but is not limited to, the following manners.

Step 504*a*: Dynamically configure the network topology information to the controller using a configuration channel.

Step 504*b*: Release the network topology information on the controller using a standard interface.

For example, the MANO may notify the controller using a Restful interface event. After receiving the notification by means of the interface event, the controller queries the MANO to obtain the network topology information using a Restful interface.

Similarly, step 505 of releasing the changed network topology information on the controller may include, but is not limited to, the following manners.

Step 505*a*: Release the changed network topology information on the controller using a configuration channel.

Step 505*b*: Release the changed network topology information on the controller using a standard interface.

Further, the MANO may notify the controller using a configuration interface (netcfg) event or a Restful interface event. After receiving the notification by means of the interface event, the controller queries the MANO to obtain the changed network topology information using a netcfg interface or a Restful interface.

In some other embodiments of the present disclosure, if the SC-M is deployed outside the MANO, for example, in the OSS, the MANO first obtains the network topology information of the VAS instance and the corresponding SSW instance in the foregoing manner, then the SC-M obtains the network topology information of the VAS instance and the corresponding SSW instance from the MANO, and the SC-M may release the network topology information on the controller by means of a configuration channel.

In some embodiments of the present disclosure, related information released by the SC-M on the controller may further include, in addition to the network topology information of the VAS instance and the SSW instance, configuration and status information of the VAS instance and the SSW instance, information about a virtual network interface card (VNIC) of the VAS instance, information about a VNIC of the SSW instance, and the like, for example, a media access control (MAC) address, an Internet Protocol (IP) address, and a state of the VNIC of the SSW instance, and a MAC address, an IP address, and a state of the VNIC of the VAS instance.

Refer to the following Table 1, Table 2, and Table 3 for details.

TABLE 1

Network topology information of VAS instance and SSW instance

| Information name | Chinese information name | Information description |
| --- | --- | --- |
| network index | index of a connected network | Network index in a template is used |
| network name | network name | Network name |
| network state | network state | Network state |

TABLE 1-continued

Network topology information of VAS instance and SSW instance

| Information name | Chinese information name | Information description |
|---|---|---|
| Interface type | network interface type | Value of a network interface connection type: vSwitch-connect using a virtual switch Netmap-connect using a netmap Passthrough-hard pass-through SoftPassthrough-soft pass-through |
| network type | network type | Values of network types: PLAT-no VLAN VLAN-single VLAN ID VLAN TRUNK-VLAN relay Q in Q VLAN-two-layer nested VLAN |
| vlan id | vlan id | Identity number of a virtual LAN |

TABLE 2

Configuration and status information of VAS instance

| Information name | Chinese information name | Information description |
|---|---|---|
| vm_name | vas instance name | VAS virtual machine instance |
| vm_state | vm state | State: normal, failure, stopped, or the like |
| weight | vnf instance weight | Load sharing weight of the VAS VNF instance member in a group |
| service type | service type name | Type of a service group instance, "firewall\|loadbalance\|ips\|ids\|woc\|dpi\|cache..." |
| vas type | vas type | L2 transparent\|routing type\|non-transparent |
| faultply | fault processing policy | drop\|bypass\|reselect |
| affinity_group | affinity group to which the VAS instance belongs; a newly created vm is deployed in a same host as a vm in the group as much as possible | Affinity group to which the VAS instance belongs; a newly created VM is deployed in a same host as a VM in the group as much as possible |

TABLE 3

Information about VNIC of VAS instance

| Information name | Chinese information name | Information description |
|---|---|---|
| vnic id | vas vnic id | ID defined in a VAS VDU template |
| vnic name | vnic name | VNIC name |
| vnic state | vnic port state | VNIC state |
| ip | ip address | IP address |
| mac | mac address | MAC address |
| network index | index of a connected network | Network index in a template is used |

It can be learned from the above that in some feasible implementation manners of the present disclosure, using a technical solution of obtaining communication relationships between VAS instances and SSW instances and deploying an SSW instance and a VAS instance that need to communicate with each other on a same physical machine, the following technical effects are achieved Because the VAS instance and the SSW instance that need to communicate with each other are deployed on the same physical machine, the VAS instance and the SSW instance do not need to perform communication across physical machines, and the VAS instance only needs to have a simplest L2 communication capability. In this way, requirements for a communication capability of the VAS instance can be lowered, and processing efficiency of a service chain can be improved, thereby facilitating deployment of VAS instances of various types in the service chain and implementing that deployment of the VAS instance on a cloud is not limited to the communication capability.

In addition, the SSW instance deployed on the same physical machine as the VAS instance can sense a state of the VAS instance in time by means of heartbeat detection, and when the VAS instance has a fault, can adjust packet forwarding in time, thereby ensuring that a user service is not affected or interrupted due to the fault of the VAS instance and improving reliability of the service chain deployed on the cloud.

In addition, the SSW instance deployed on the same physical machine as the VAS instance can provide some necessary feedback information of the VAS instance to the controller to support distribution processing of complex service chain.

In order to better implement the foregoing solutions of the embodiments of the present disclosure, the following further provides related apparatuses configured to cooperate to implement the foregoing solutions.

Figure 8:
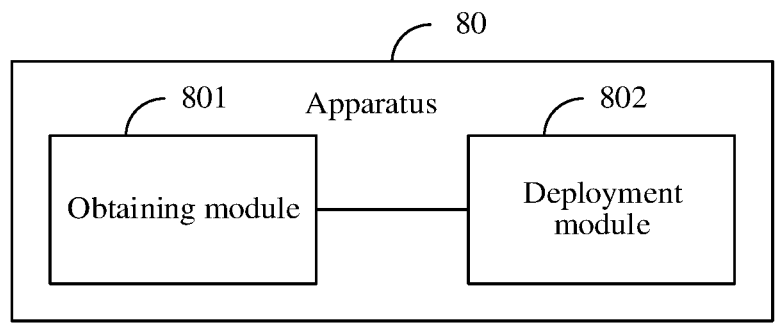
FIG. 8 is a schematic diagram of an apparatus for deploying a virtual machine instance according to an embodiment of the present disclosure.

Referring to FIG. 8, an embodiment of the present disclosure provides an apparatus 80 for deploying a virtual machine instance, which may include an obtaining module 801 configured to obtain communication relationships between VAS instances and SSW instances from a service template, where the VAS instances and the SSW instances are used to provide services in a service chain, and the service chain and the communication relationships between the VAS instances and the SSW instances are defined in the service template, and a deployment module 802 configured to deploy, according to the communication relationships, an SSW instance and a VAS instance that need to communicate with each other in the SSW instances and the VAS instances on a same physical machine.

In some embodiments of the present disclosure, at least one affinity group is predefined in the service template, each affinity group includes one SSW instance and one VAS instance that needs to communicate with the SSW instance, and the communication relationships between the SSW instances and the VAS instances are determined by the at least one affinity group, and the obtaining module 801 may be further configured to obtain the at least one affinity group from the service template.

Figure 9:
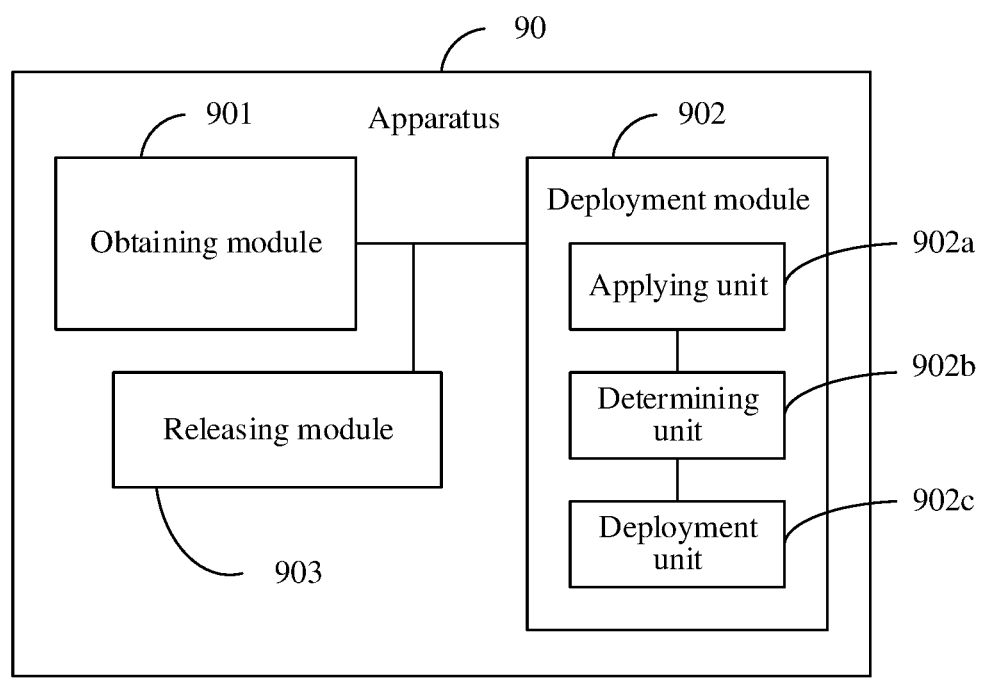
FIG. 9 is a schematic diagram of another apparatus for deploying a virtual machine instance according to an embodiment of the present disclosure.

Referring to FIG. 9, in some other embodiments of the present disclosure, another apparatus 90 for deploying a virtual machine instance is provided and may include an obtaining module 901 configured to obtain communication relationships between VAS instances and SSW instances from a service template, where the VAS instances and the SSW instances provide services in a service chain, and the service chain and the communication relationships between the VAS instances and the SSW instances are defined in the service template, and a deployment module 902 configured to deploy, according to the communication relationships, an SSW instance and a VAS instance that need to communicate with each other in the SSW instances and the VAS instances on a same physical machine.

In some embodiments, the deployment module 902 may include an applying unit 902a configured to apply to an infrastructure layer for one affinity group resource pool for each affinity group of the at least one affinity group, where resources of the affinity group resource pools applied for the affinity groups belong to a same physical machine, a determining unit 902b configured to determine to obtain an affinity group resource pool corresponding to an affinity group to which the SSW instance or the VAS instance or a VAS instance generated by scaling out the VAS instance belongs when the SSW instance or the VAS instance is deployed or the VAS instance is scaled out, and a deployment unit 902c configured to deploy, using a resource in the determined affinity group resource pool, the SSW instance or the VAS instance or a VAS instance generated by scaling out the VAS instance.

Referring to FIG. 9, in some embodiments of the present disclosure, the apparatus 90 may further include a releasing module 903 configured to obtain network topology information of the deployed SSW instance and the deployed VAS instance and release the network topology information on a controller.

In some embodiments of the present disclosure, when the network topology information is changed, the releasing module 903 is further configured to release the changed network topology information on the controller.

It may be understood that functions of functional modules of the apparatus for deploying a virtual machine instance in this embodiment of the present disclosure may be further implemented according to the method in the foregoing method embodiment. Refer to a related description in the foregoing method embodiment for a specific implementation process of the apparatus. Details are not described herein again.

It can be learned from the above that in some feasible implementation manners of the present disclosure, using a technical solution of obtaining communication relationships between VAS instances and SSW instances and deploying an SSW instance and a VAS instance that need to communicate with each other on a same physical machine, the following technical effects are achieved.

Because the VAS instance and the corresponding SSW instance that need to communicate with each other are deployed on the same physical machine, the VAS instance and the SSW instance do not need to perform communication across physical machines, and the VAS instance only needs to have a simplest L2 communication capability. In this way, requirements for a communication capability of the VAS instance can be lowered, and processing efficiency of a service chain can be improved, thereby facilitating deployment of VAS instances of various types in the service chain and implementing that deployment of the VAS instance on a cloud is not limited to the communication capability.

An embodiment of the present disclosure further provides a computer storage medium. A program may be stored in the computer storage medium. When being executed, the program includes some or all of the steps of the method for deploying a virtual machine instance recorded in the foregoing method embodiment.

Figure 10:
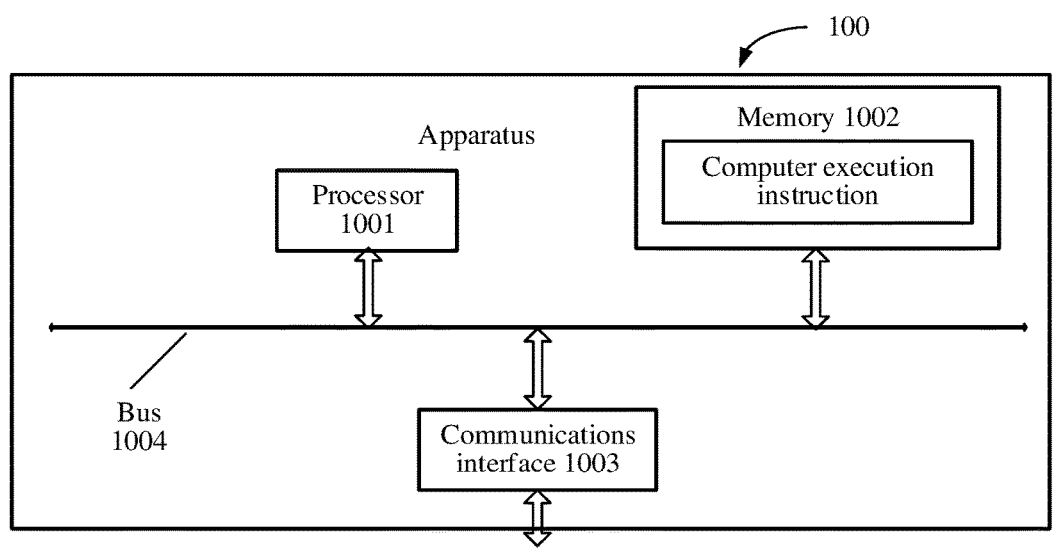
FIG. 10 is a schematic structural diagram of an apparatus for deploying a virtual machine instance according to an embodiment of the present disclosure.

Referring to FIG. 10, an embodiment of the present disclosure provides an apparatus 100 for deploying a virtual machine instance.

The apparatus 100 may be a micro processing computer. For example, the apparatus 100 may be one of portable devices such as a general-purpose computer, a carrier branded smartphone, a mobile phone terminal, and a flat mobile phone. The apparatus 100 may include a processor 1001, a memory 1002, a communications interface 1003, and a bus 1004. The processor 1001, the memory 1002, and the communications interface 1003 are connected using the bus 1004 and complete mutual communication. The memory 1002 is configured to store program code. When the apparatus 100 runs, the processor 1001 executes the program code stored in the memory 1002 such that the apparatus 100 performs the method for deploying a virtual machine instance recorded in the foregoing method embodiment.

Further, the bus 1004 may be an Industry Standard Architecture (ISA) bus, a Peripheral Component Interconnect (PCI) bus, an Extended Industry Standard Architecture (EISA) bus, or the like. The bus 1004 may be classified into one or more of an address bus, a data bus, or a control bus. For ease of representation, in FIG. 10, the bus 1004 is represented using only one bold line, but it does not indicate that there is only one bus or only one type of bus.

The memory 1002 is configured to store executable program code. The program code includes a computer operation instruction. When the apparatus 100 executes the program code, the apparatus 100 may complete step 301 and step 302 in the embodiment of FIG. 3 or may implement step 501 to step 505 in the embodiment of FIG. 5. The memory 1002 may include a high-speed random access memory (RAM). Optionally, the memory 1002 may further include a non-volatile memory. For example, the memory 1002 may include a magnetic disk memory.

The processor 1001 may be a Central Processing Unit (CPU), or the processor 1001 may be an Application Specific Integrated Circuit (ASIC), or the processor 1001 may be one or more integrated circuits configured to implement the embodiments of the present disclosure.

The processor 1001 is configured to read the instruction stored in the memory 1002 in order to perform operations of obtaining communication relationships between VAS instances and SSW instances from a service template, and deploying, according to the communication relationships, an SSW instance and a VAS instance that need to communicate with each other in the SSW instances and the VAS instances on a same physical machine.

Optionally, at least one affinity group is predefined in the service template, each affinity group includes one SSW instance and one VAS instance that needs to communicate with the SSW instance, and the communication relationships between the SSW instances and the VAS instances are determined by the at least one affinity group, and the processor 1001 is further configured to obtain the at least one affinity group from the service template.

Optionally, the processor 1001 is further configured to apply to an infrastructure layer for one affinity group resource pool for each affinity group of the at least one affinity group, where resources of the affinity group resource pools applied for the affinity groups belong to a same physical machine, determine an affinity group resource pool corresponding to an affinity group to which the SSW instance or the VAS instance belongs when the SSW instance or the VAS instance is deployed, and deploy the SSW instance or the VAS instance using a resource in the determined affinity group resource pool.

Optionally, the processor 1001 is further configured to obtain network topology information of the deployed SSW instance and the deployed VAS instance.

Optionally, the communications interface 1003 is configured to release the network topology information on a controller.

Optionally, when the network topology information is changed, the communications interface 1003 is further configured to release the changed network topology information on the controller.

It can be learned from the above that in some feasible implementation manners of the present disclosure, using a technical solution of obtaining communication relationships between VAS instances and SSW instances and deploying an SSW instance and a VAS instance that need to communicate with each other on a same physical machine, the following technical effects are achieved.

Because the VAS instance and the corresponding SSW instance that need to communicate with each other are deployed on the same physical machine, the VAS instance and the SSW instance do not need to perform communication across physical machines, and the VAS instance only needs to have a simplest L2 communication capability. In this way, requirements for a communication capability of the VAS instance can be lowered, and processing efficiency of a service chain can be improved, thereby facilitating deployment of VAS instances of various types in the service chain and implementing that deployment of the VAS instance on a cloud is not limited to the communication capability.

In the foregoing embodiments, the description of each embodiment has respective focuses. For a part that is not described in detail in an embodiment, reference may be made to related descriptions in other embodiments.

It should be noted that, for ease of description, the foregoing method embodiments are described as a series of action combinations. However, a person skilled in the art should understand that the present disclosure is not limited to the described sequence of the actions, because some steps may be performed in another sequence or performed at the same time according to the present disclosure. In addition, a person skilled in the art should also appreciate that all the embodiments described in the specification are examples of embodiments, and the related actions and modules are not necessarily mandatory to the present disclosure.

A person of ordinary skill in the art may understand that all or a part of the steps of the methods in the embodiments may be implemented by a program instructing relevant hardware. The program may be stored in a computer readable storage medium. The storage medium may include a read-only memory (ROM), a RAM, a magnetic disk, or an optical disc.

The method and the apparatus for deploying a virtual machine instance and the device that are provided in the embodiments of the present disclosure are described in detail above. The principle and implementation manners of the present disclosure are described herein using specific examples. The description about the embodiments is merely provided to help understand the method and core ideas of the present disclosure. In addition, a person of ordinary skill in the art may make variations and modifications in terms of the specific implementation manners and application scopes according to the ideas of the present disclosure. Therefore, the content of specification shall not be construed as a limit to the present disclosure.

What is claimed is:

1. A method for deploying a virtual machine instance, comprising:
   obtaining communication relationships between value-added server (VAS) instances and service switch (SSW) instances from a service template, wherein the service template comprises at least one of a network service description (NSD) or a virtual network function description (VNFD), wherein the VAS instances and the SSW instances provide services in a service chain, and wherein the service chain and the communication relationships between the VAS instances and the SSW instances are defined in the service template; and
   deploying, according to the communication relationships, an SSW instance and a VAS instance that need to communicate with each other on a same physical machine, wherein the SSW instance and the VAS instance are selected from the SSW instances and the VAS instances, respectively.

2. The method according to claim 1, wherein at least one affinity group is predefined in the service template, wherein each affinity group comprises one SSW instance and one VAS instance that needs to communicate with the one SSW instance, wherein obtaining the communication relationships between VAS instances and SSW instances from the service template comprises obtaining the at least one affinity group from the service template.

3. The method according to claim 2, wherein deploying the SSW instance and the VAS instance that need to communicate with each other in the SSW instances and the VAS instances on the same physical machine comprises:
   applying to an infrastructure layer for one affinity group resource pool for each affinity group of the at least one affinity group, wherein resources of the affinity group resource pool applied for affinity groups belong to the same physical machine; and
   deploying the SSW instance or the VAS instance using a resource in the affinity group resource pool.

4. The method according to claim 1, wherein the SSW instance serves as an ingress and an egress for a service chain packet of the VAS instance on the same physical machine, and wherein the SSW instance is configured to forward, according to a flow table forwarding function, the service chain packet to the VAS instance for processing.

5. The method according to claim 1, further comprising:
   obtaining network topology information of the deployed SSW instance and the deployed VAS instance; and
   releasing the network topology information on a controller.

6. The method according to claim 5, wherein when the network topology information is changed, the method further comprises releasing the changed network topology information on the controller.

7. An apparatus for deploying a virtual machine instance, comprising:
- a non-transitory computer-readable storage medium comprising computer-executable instructions; and
- a processor coupled to the non-transitory computer-readable storage medium, wherein the computer-executable instructions cause the processor to be configured to:
  - obtain communication relationships between value-added server (VAS) instances and service switch (SSW) instances from a service template, wherein the service template comprises at least one of a network service description (NSD) or a virtual network function description (VNFD), wherein the VAS instances and the SSW instances provide services in a service chain, and wherein the service chain and the communication relationships between the VAS instances and the SSW instances are defined in the service template; and
  - deploy, according to the communication relationships, an SSW instance and a VAS instance that need to communicate with each other on a same physical machine, wherein the SSW instance and the VAS instance are selected from the SSW instances and the VAS instances, respectively.

8. The apparatus according to claim 7, wherein at least one affinity group is predefined in the service template, wherein each affinity group comprises one SSW instance and one VAS instance that needs to communicate with the one SSW instance, wherein the computer-executable instructions further cause the processor to be configured to obtain the at least one affinity group from the service template.

9. The apparatus according to claim 8, wherein the computer-executable instructions further cause the processor to be configured to:
- apply to an infrastructure layer for one affinity group resource pool for each affinity group of the at least one affinity group, wherein resources of the affinity group resource pool applied for affinity groups belong to the same physical machine; and
- deploy the SSW instance using a resource in the affinity group resource pool.

10. The apparatus according to claim 8, wherein the computer-executable instructions further cause the processor to be configured to:
- apply to an infrastructure layer for one affinity group resource pool for each affinity group of the at least one affinity group, wherein resources of the affinity group resource pool applied for affinity groups belong to the same physical machine; and
- deploy the VAS instance using a resource in the affinity group resource pool.

11. The apparatus according to claim 7, wherein the computer-executable instructions further cause the processor to be configured to:
- obtain network topology information of the deployed SSW instance and the deployed VAS instance; and
- release the network topology information on a controller.

12. The apparatus according to claim 11, wherein when the network topology information is changed, the computer-executable instructions further cause the processor to be configured to release the changed network topology information on the controller.

13. A computer program product comprising a non-transitory computer readable storage medium storing program code thereon for deploying a virtual machine instance, the program code comprising instructions for executing a method that comprises:
- obtaining communication relationships between value-added server (VAS) instances and service switch (SSW) instances from a service template, wherein the service template comprises at least one of a network service description (NSD) or a virtual network function description (VNFD), wherein the VAS instances and the SSW instances provide services in a service chain, and wherein the service chain and the communication relationships between the VAS instances and the SSW instances are defined in the service template; and
- deploying, according to the communication relationships, an SSW instance and a VAS instance that need to communicate with each other in the SSW instances and the VAS instances on a same physical machine.

14. The computer program product according to claim 13, wherein at least one affinity group is predefined in the service template, wherein each affinity group comprises one SSW instance and one VAS instance that needs to communicate with the one SSW instance, wherein obtaining the communication relationships between VAS instances and SSW instances from the service template comprises obtaining the at least one affinity group from the service template.

15. The computer program product according to claim 14, wherein deploying the SSW instance and the VAS instance that need to communicate with each other in the SSW instances and the VAS instances on the same physical machine comprises:
- applying to an infrastructure layer for one affinity group resource pool for each affinity group of the at least one affinity group, wherein resources of the affinity group resource pool applied for affinity groups belong to the same physical machine; and
- deploying the SSW instance or the VAS instance using a resource in the affinity group resource pool.

16. The computer program product according to claim 13, wherein the SSW instance and the VAS instance deployed on the same physical machine do not communicate with other SSW instances and VAS instances in the SSW instances and the VAS instances deployed on physical machines other than the same physical machine.

17. The computer program product according to claim 13, further comprising:
- obtaining network topology information of the deployed SSW instance and the deployed VAS instance; and
- releasing the network topology information on a controller.

18. The computer program product according to claim 17, wherein when the network topology information is changed, the method further comprises releasing the changed network topology information on the controller.

19. The method according to claim 1, further comprising deploying, according to the communication relationships, an affinity group on one physical machine that is different that the same physical machine on which the SSW instance and the VAS instance are deployed, wherein the affinity group comprises only one SSW instance and at least two VAS instances that need to communicate with the one SSW instance, wherein the one SSW instance is selected from the SSW instances and the at least two VAS instances are selected from the VAS instances, wherein each of the at least two VAS instances are configured to only communicate with the one SSW instance on the one physical machine, and wherein the VAS instance on the same physical machine is configured to only communicate with the SSW instance on the same physical machine.

20. The method according to claim 19, wherein the SSW instance on the same physical machine is configured to communicate with both the VAS instance on the same physical machine and the one SSW instance on the one physical machine that is different than the same physical machine.

\* \* \* \* \*